United States Patent [19]
Duer

[11] 3,798,749
[45] Mar. 26, 1974

[54] METHOD AND TOOL FOR EFFECTING A THREAD LOCK

[76] Inventor: Morris J. Duer, 4157 Mar-Moor Dr., Lansing, Mich. 48917

[22] Filed: Oct. 21, 1971

[21] Appl. No.: 191,437

[52] U.S. Cl. .................................... 29/520, 81/10
[51] Int. Cl. ...................... B21d 39/00, B23p 11/00
[58] Field of Search .......... 151/2, 21 C, 27, 28, 30, 151/15, 19, 19 A, 2 A; 81/10, 52.4, 53.2; 29/520

[56] References Cited
UNITED STATES PATENTS

| | | | |
|---|---|---|---|
| 575,109 | 1/1897 | Gulick | 151/19 R |
| 1,139,671 | 5/1915 | Goodall | 151/19 R |
| 1,969,142 | 8/1934 | McIntyre | 151/19 R |
| 2,191,201 | 2/1940 | Kass | 151/19 R |
| 1,210,310 | 12/1916 | Hickling et al | 151/21 C |
| 2,513,780 | 7/1950 | Baxter | 81/10 |

*Primary Examiner*—James L. Jones, Jr.
*Attorney, Agent, or Firm*—Malcolm R. McKinnon

[57] ABSTRACT

A tool for assembling a lock nut to a complementary male threaded member which tool rotates the lock nut to a seated position relative to the work and moves axially relative to the nut to deform a lock portion of the nut relative to the thread of the complementary threaded member or which may deform both the lock portion and the thread on the complementary threaded member.

2 Claims, 12 Drawing Figures

PATENTED MAR 26 1974 3,798,749

INVENTOR.
Morris J. Duer
BY
Malcolm R. McKinnon
Irwin J. Groh
ATTORNEYS

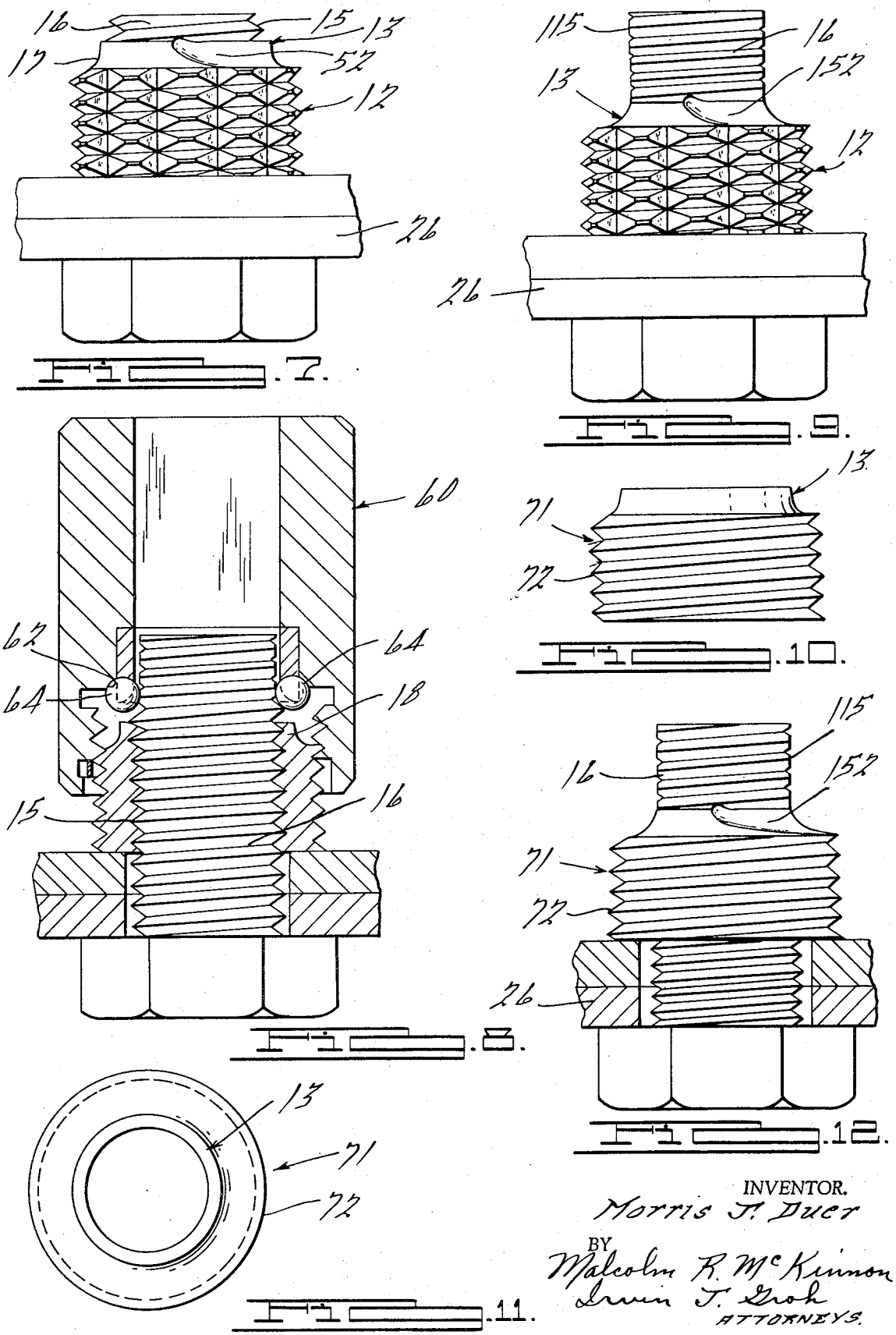

METHOD AND TOOL FOR EFFECTING A THREAD LOCK

BRIEF SUMMARY OF THE INVENTION

This invention relates to tools for applying lock nuts and, more particularly, to an improved tool which deforms a locking portion on the nut after the nut has been threaded on a bolt and into engagement with the surface of the work to be assembled.

To stake a nut assembly on its complementary threaded member or bolt, by deforming either the nut or the bolt or both, it has been necessary to use large, cumbersome tools which often limit assembly to a fixed work station or which prevent assembly in close quarters or in the field. Moreover, in some assembly operations particularly in the automobile industry, the manufacturer demands that lock fasteners be of a type which do not deform or affect the configuration or physical characteristics of the bolt. In such operations the nut only is deformed or subject to large pressure to bind it to the thread of the bolt. In still other applications, deformation of the bolt thread as well as the nut thread is permissible or required. These different forms of assembly have heretofore required different types of fasteners and also different types of tools to make the assembly.

Some forms of lock nut, particularly those of the free spinning type which are staked or deformed after the nut is in torqued position relative to the work to be assembled, require a tool which is capable of applying a larger pressure. As a consequence the tool is larger and cumbersome, often requiring stationary mounting so that the work to be assembled must be brought to and moved relative to the tool.

It is an object of this invention to provide an improved tool for assemblying lock nuts and bolts which is very similar to conventional socket wrenches and may be used with the typical ratchet type socket handles of tool fittings.

Another object of the invention is to provide an improved tool for applying lock nuts which with slight modification in dimensions may be made to deform only the lock portion on the nut or to deform the lock portion on the nut and the thread of the mating bolt.

Another object of the invention is to provide an improved tool of the foregoing type in which the tool and nut coact to generate the pressure required to deform the lock portion of the nut.

Another object of the invention is to provide a tool for applying lock nuts which may be used in close quarters and in the field and is not limited to a stationary position in the assembly line.

Another object of the invention is to provide a tool for applying lock nuts which deforms the lock portion of the nut and imparts a visible form of indentation making it possible to visually determine whether or not a nut has been wrenched with the proper amount of torque to complete the assembly.

Still another object of the invention is to provide an improved tool for lock nuts which is economical and commercially feasible to manufacture and to use and which is durable, efficient and reliable in use.

The above as well as other objects and advantages of the present invention will become apparent from the following description, the appended claims, and the accompanying drawings which disclose preferred embodiments of the invention.

BRIEF DESCRIPTION OF THE DRAWINGS

FIG. 7 is an elevational view of the lock nut after it has been assembled in position and locked by the tool illustrated in FIG. 3;

FIG. 8 is a cross-sectional, elevational view similar to FIG. 6 and showing a lock nut positioned on a mating bolt prior to being locked by a tool embodying another form of the invention;

FIG. 9 is an elevational view of the lock nut after it has been assembled in position and locked by the tool illustrated in FIG. 8;

FIG. 10 is an elevational view of a lock nut of a different form than the lock nut illustrated in FIGS. 1 and 2 which may be applied with the embodiments of the invention shown in FIG. 6 or FIG. 8;

FIG. 11 is a top plan view of the nut shown in FIG. 10; and

FIG. 12 is an elevational view of the lock nut illustrated in FIG. 10 after it has been assembled and locked on a mating bolt.

DESCRIPTION OF THE PREFERRED EMBODIMENTS

Figure 1:
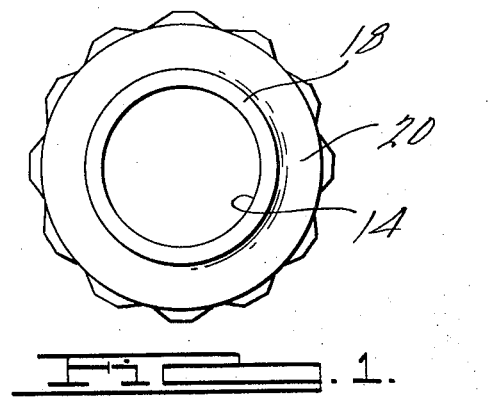
FIG. 1 is a top plan view of a nut of the type used with the tool embodying the present invention.
Figure 2:
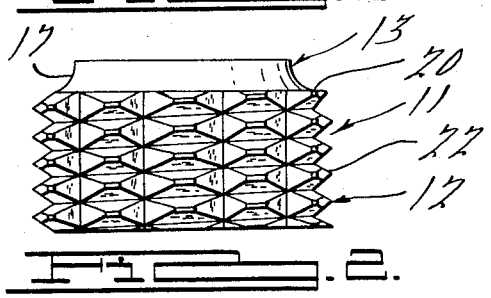
FIG. 2 is an elevational view of the lock nut illustrated in FIG. 1.

Referring to the drawings and particularly to FIGS. 1 and 2, there is shown a one-piece lock nut 11 of the type adapted to be applied with the tool embodying the present invention. The lock nut 11 includes a main body portion 12 and a thread locking portion 13 formed at the upper end of the body portion 12. The body portion 12 and lock portion 13 are provided with a continuous, uninterrupted, internal thread 14 of conventional type which is adapted to mate with a complementary thread 15 on a conventional bolt 16 as shown, for example, in FIG. 6.

Figure 6:
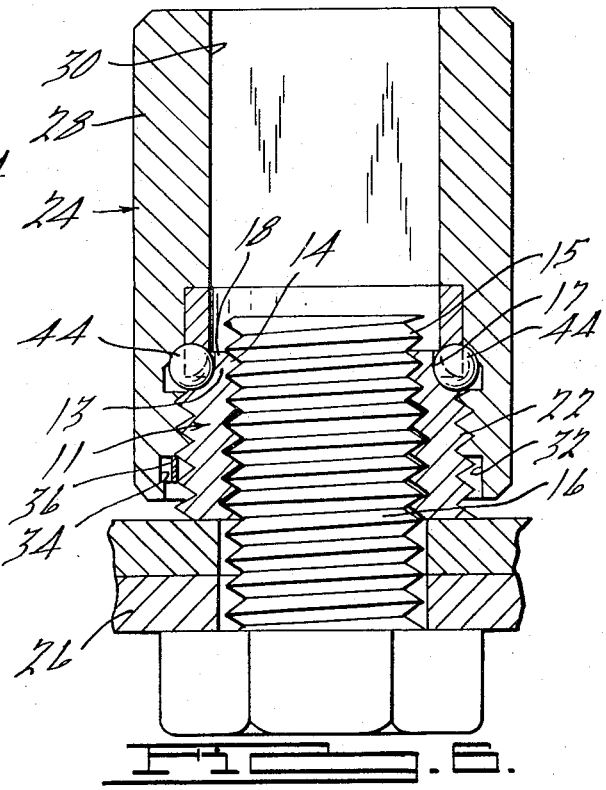
FIG. 6 is a cross-sectional, elevational view of the lock nut illustrated in FIGS. 1 and 2 showing it in threaded engagement with a mating bolt and seated on the workpiece with the tool of FIG. 3 in position after the nut has been locked on the bolt and before the tool has been removed.

The lock portion 13 at the upper end of the body portion has a configuration very similar to an annular ball raceway 17 for ball bearings. As best seen in FIGS. 1 and 6, the upper extremity of the lock portion 13 forms a relatively thin, annular wall 18 between the internal thread 14 and the outer surface of the lock portion 13 and the lower portion of the lock portion 13 forms a relatively wide annular base 20 merging with the body portion 12 of the lock nut 11.

The exterior of the main body 12 of the nut 11 is provided with an external thread 22, the particular configuration shown being accomplished by a forming a thread on a body portion 12 having 12 points similar to a conventional 12 point nut. The external thread 22 is angled in the same direction as the internal thread, that is, with a right hand internal thread 14, the external thread 22 is also a right hand thread but at a helix or lead angle larger than the helix or lead angle of the internal thread 14.

Figure 3:
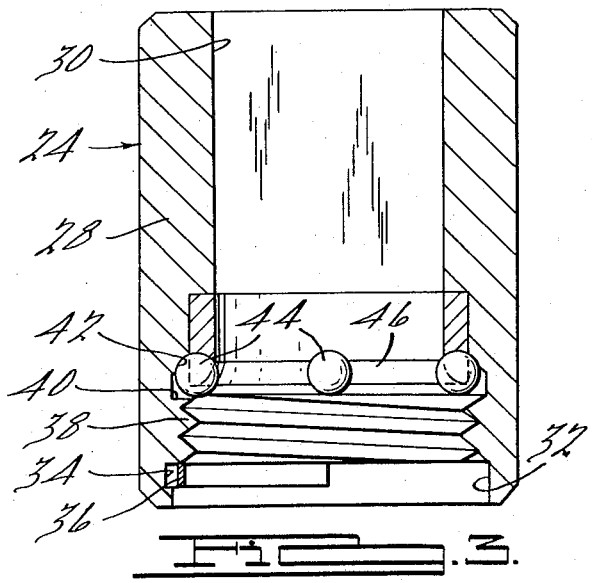
FIG. 3 is a cross-sectional, elevational view of the tool embodying the present invention.
Figure 4:
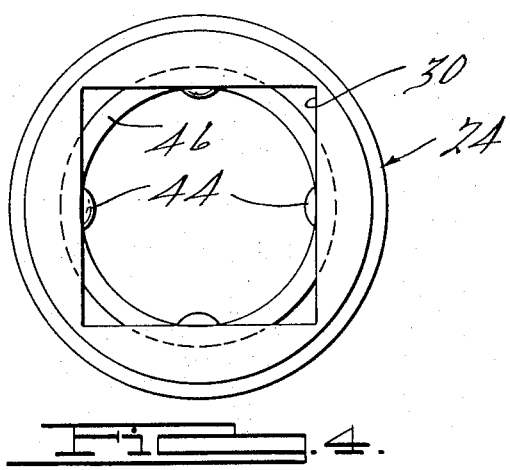
FIG. 4 is a top plan view of the tool illustrated in FIG. 3.
Figure 5:
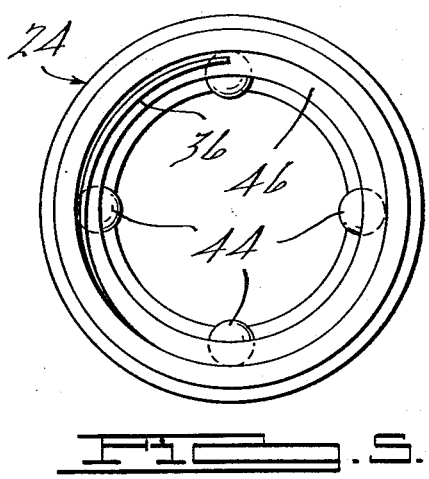
FIG. 5 is a bottom plan view of the tool illustrated in FIG. 3.

Referring now to FIGS. 3, 4 and 5, the tool 24 which is used to apply the lock nut 11 to a bolt includes a socket body 28 very similar in form to a socket of a conventional socket wrench. The upper end of the body 28 is provided with a square opening 30 to receive the square stud of a ratchet socket wrench (not shown) or similar manual or power driving tool. The lower end of the socket body 28 has a bore 32 in which is formed a groove 34 to support a spring element 36 which engages the exterior of a nut to releasably hold the latter in position in the bore 32. Immediately above the groove 34, the bore 32 is provided with an internal thread 38 which is complementary to the thread 22 on the exterior of the nut 11.

Adjacent the upper end of the internal thread 38, and below the square socket 30, the bore 32 is provided with an annular recess 40 which forms a ball raceway 42 and receives a plurality of hardened die or ball elements 44. In the specific embodiment shown, four balls are uniformly spaced relative to the raceway 42 by a retainer ring 46 although it will be understood that a larger or smaller number of balls may be used.

Referring to FIG. 6, the tool 24 is illustrated in position relative to the lock nut 11 with the latter threaded on the bolt 16 and seated against the surface of the pieces to be assembled. In the position shown the spring element 36 is in engagement with the external thread 22 and the ball elements 44 of the tool 24 are disposed in engagement with the raceway 17 of lock portion 13 at the upper end of the nut 11. It will be noted also that the balls 44 are so disposed that they are confined to move in a path which clears the major diameter of the bolt 16.

To apply a lock nut 11 with the tool 24, the nut is positioned in the bore 32 so that the spring element engages the external thread 22 and holds the nut 11 relative to the tool 24. After the tool 24 and nut 11 are positioned in axial alignment with a bolt 16, rotation of the tool 24 in a clockwise direction will engage the internal thread 14 of the nut with the external thread 15 on the bolt 16.

At any time in which the resistance to threading of the nut 11 on the bolt 16 becomes greater than the frictional force applied to the exterior thread 22 by the spring element 36, the threading of the nut on the bolt will stop and the internal thread 38 of the tool 24 will begin to mate with the external thread 22 on the relatively stationary nut 11. Rotation of the tool 24 and nut 11 will continue until the nut 11 is fully threaded on the bolt 16 with the lower surface of the nut 11 in engagement with the surface of the work assembly 26 and until the die or ball elements 44 of the tool 24 engage the raceway 17. At this point, the tool 24, the nut 11, the bolt 16 and work assembly 26 will occupy the relative positions shown in FIG. 6.

With the parts so positioned, continued rotation of the tool 24 will first tighten the nut 11 on the bolt 16 until sufficient resistance to turning of the nut is encountered and rotation of the nut stops. Thereafter, rotation of the tool 24 relative to the stationary nut will cause the tool 24 to move axially relative to both the lock nut and the bolt 16. This causes the balls 44 to exert a force downwardly on the raceway 17 of the nut 11 to deflect the relatively thin wall section 18 into the groove formed by the bolt thread 15. At the same time each ball 44 makes an indentation 52 in the raceway 17 of the lock portion 13 and deforms the upper surface of the lock nut. Rotation of the tool 24 in a counterclockwise direction, removes the tool 24 from the nut 11 and the nut appears as seen in FIG. 7 with the indentations 52 in the raceway 17 inclined on an angle conforming to the helix or lead angle of the internal thread 38 of the tool 24.

It should be noted that the tool 24 distorts the nut 11 symmetrically and uniformly inwardly. Furthermore, the deformed nut 11 as seen in FIG. 7 makes it possible to visually observe and determine that the nut not only has been positioned relative to the work assembly but also that it has been torqued or tightened to the desired amount. The indentations 52 will be readily visible even to casual inspection.

As can be seen from an examination of FIG. 3, the balls 44 in the socket member 24 are disposed in such a manner that a clearance is provided between the major diameter of the bolt thread 15 and the internal diameter of the path of movement of the balls 44 during rotation of the socket member 24. Consequently, use of the socket member to deform the lock portion 13 of the nut 11 in no way interferes with the thread 15 of the bolt 16 and the latter remains in undeformed condition.

After the nut is applied with the tool 24 shown in FIG. 3 so that the lock portion 13 of the lock nut is deformed, it is possible to remove the lock nut 11 by using a conventional twelve point socket or box wrench. Such removal must be made against the resistance of the lock formed by the lock portion 13 but it may be done without detrimental effect on the bolt thread 15 which may be reused with a conventional nut.

Referring now to FIG. 8, another embodiment of the invention is shown in the form of a tool 60. The tool 60 is similar in most respects to the tool 24 shown in FIGS. 4 through 6 except that for any given size of nut and bolt, the raceway 62 is of a smaller diameter than the raceway 42 of the tool 24. The inside diameter of the circumferential path described by the balls 64 during rotation of the tool 24 is less than the major diameter of the bolt 16 and slightly larger than the minor diameter of the bolt.

When the tool 60 is used to apply a nut such as shown in FIGS. 1 and 2 to a bolt, the nut 11 is free spinning on the thread 15 of the bolt until its lower surface engages the work assembly and the balls 64 engage the upper end of the bolt 16 as shown in FIG. 8. Thereafter, rotation of the tool 60 will cause it to move axially relative to the nut 11 so that the balls 64 distort the bolt thread 15 until the balls come into engagement with the thin wall portion 18 and distort the latter axially inward to lock the nut to the bolt 16 in much the same manner as the tool in FIG. 3. Indentations 152 will be formed in the nut as best seen in FIG. 9 and the crest 115 of the bolt thread 15 also will have been deformed.

With this form of tool, deformation of the bolt thread 15 and the nut 11 makes it very difficult to remove the nut although a conventional twelve point socket or box wrench may be used to do so. However, after such disassembly, reuse of the bolt and nut are not advisable.

It will be noted that with either of the embodiments shown in FIGS. 3 or 8, the axial force required to distort or deflect the nut 11 or the bolt thread 15 is generated solely by the threaded engagement of the rotating tool 24 with the stationary nut 11 and the need for a press or the like to apply the necessary force is obviated.

Referring now to FIGS. 10, 11 and 12 there is shown another form of a lock nut 71 which may be used with either of the embodiments of the invention shown in FIGS. 3 or 8. In most respects the lock nut 71 is identical with the lock nut shown in FIGS. 1 and 2. However, the lock nut 71 is formed from a cylindrical blank rather than from a twelve point nut blank. The external thread 72, as best seen in FIG. 10, appears as a conventional thread without any indentations in the crest of the thread. In this form of the invention the lead or helix angle is similar to the version shown in FIGS. 1 and 2, that is, the angle is greater than the lead or helix angle of the internal thread of the nut. The nuts 71 may be applied by the tool shown in FIG. 3 so that the lock portion 13 is distorted against the thread 15 of the bolt 16 or, in the alternative, the tool shown in FIG. 10 may be used so that both the lock portion of the nut and the bolt thread are distorted. In the applied position in a work assembly, the lock nut will have the appearance shown in FIG. 12 so that the indentations make it possible to visually determine that the nut has been torqued properly into position. With the form of the nut shown in FIGS. 10, 11 and 12, the cylindrical exterior of the nut will not accept any conventional form of wrench and the lock nut is particularly adapted for use in assemblies where removal is to be discouraged if, in fact, not prevented.

From the foregoing it will be seen that there has been provided a tool for assembling lock nuts on bolts which is similar to conventional socket wrenches and which may be used in close quarters on work assemblies and in the field since the tool is not limited to a stationary position in an assembly line.

Also, there has been provided a tool for applying lock nuts which with slight modification in dimensions may be made to deform a lock portion on a lock nut without affecting the thread of the bolt or, in the alternative, the tool may be employed to deform both the external thread of a bolt and a lock portion of a lock nut. Furthermore, the tool imparts a particular form of indentation on a lock nut so that the latter is subject to visual inspection to determine whether or not it has been properly tightened in the work assembly.

While preferred embodiments of the invention have been shown and described it will be understood that various modifications may be made without departing from the spirit of the invention.

What is claimed is:

1. A tool for applying a lock nut, said tool comprising a body member having an internally threaded bore portion at one end thereof, means adapted to receive a torque appling member at the other end thereof, said internally threaded portion of said body member being adapted to receive a complementary external thread on a lock nut having its internal thread engaged with a bolt member, said body member defining a recess adjacent said one end thereof, a spring element supported in said recess for releasably holding a lock nut in the internally threaded bore portion of said body member, and a plurality of circumferentially disposed die elements intermediate said internally threaded portion and said other end, said die elements being adapted to engage a peripheral surface of a lock nut and distort the latter upon axial movement of said tool relative to said lock nut during rotation of said tool relative to said lock nut.

2. In the method of applying a lock nut having internal and external threads with different helix angles to a bolt having an external thread complementary to the internal thread in said lock nut, the steps comprising: positioning an internally threaded tool member on the complementary external thread of said lock nut, releasably holding said lock nut relative to said tool member, rotating said tool member and said nut simultaneously relative to a bolt until said nut engages the surface of the work to be assembled and resists rotation of said nut, rotating said tool member relative to said nut to move said tool member axially of said nut so that said tool member engages a peripheral portion of said nut and permanently distorts the latter into engagement with the bolt, and thereafter removing said tool member from said nut.

* * * * *